United States Patent [19]

Coumo, Jr. et al.

[11] 4,165,178

[45] Aug. 21, 1979

[54] GAP MEASUREMENT TOOL

[75] Inventors: Salvatore R. Coumo, Jr., Wappingers Falls; Thomas M. Ellington, Jr., Poughkeepsie, both of N.Y.

[73] Assignee: International Business Machines Corporation, Armonk, N.Y.

[21] Appl. No.: 920,905

[22] Filed: Jun. 29, 1978

[51] Int. Cl.² .............................................. G01C 3/00
[52] U.S. Cl. ......................................... 356/1; 356/3; 356/372; 356/401
[58] Field of Search .................. 356/1, 3, 4, 371, 372, 356/373, 375, 378, 399, 401

[56] References Cited

U.S. PATENT DOCUMENTS

| 3,137,756 | 6/1964 | Gunther et al. | 356/1 |
| 3,139,792 | 7/1964 | Wenthe | 356/1 |
| 4,113,389 | 9/1978 | Kaye | 356/373 |

*Primary Examiner*—S. C. Buczinski

*Attorney, Agent, or Firm*—Harold H. Sweeney, Jr.

[57] ABSTRACT

The gap between a component and its associated substrate is measured by casting an edge line shadow in a spot of light directly below an edge of the component. A viewing means is fixed at a predetermined angle with the vertical from the board. The viewing means is adjusted tangent to either the edge shadow of the component in the light spot or the bottom edge of the component. The distance that the viewing means is moved horizontally from either the edge shadow in the light spot or the bottom edge of the component to the other is measured. This measured horizontal distance forms one side of a right triangle and the other side which is the vertical distance between the edge shadow in the light spot on the board and the bottom edge of the component, can be calculated from the measured side length and the opposite angle which is the fixed angle the viewing means makes with the vertical from the board.

10 Claims, 9 Drawing Figures

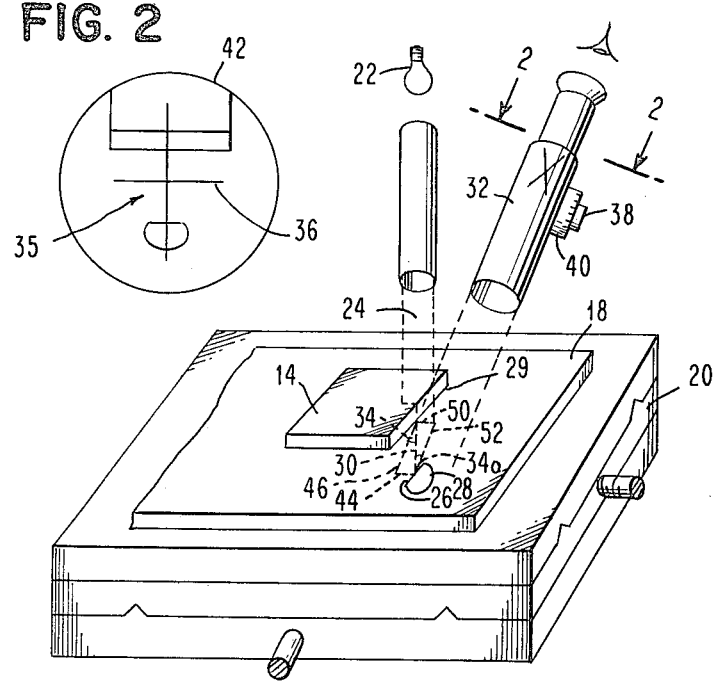
FIG. 2
FIG. 1
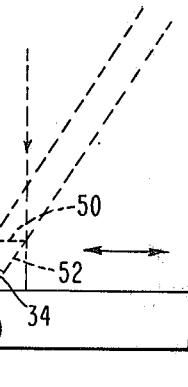
FIG. 3
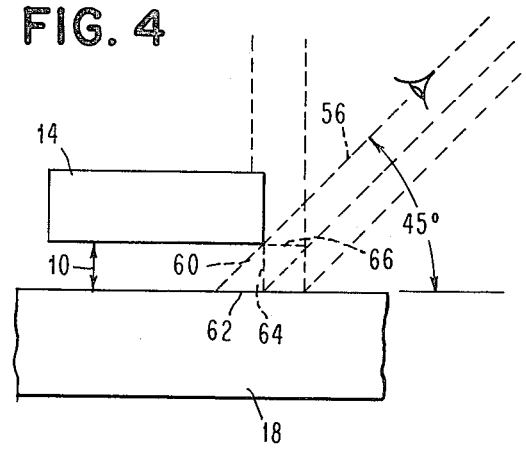
FIG. 4
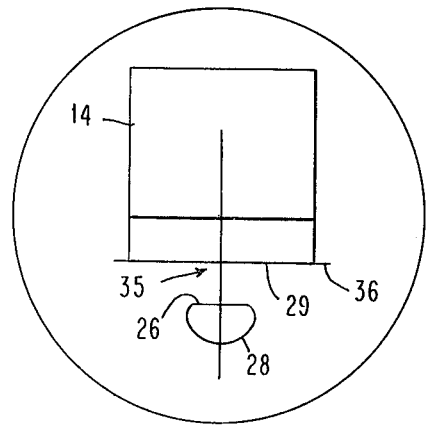
FIG. 5

GAP TOO LARGE

GAP TOO SMALL

GAP MEASUREMENT TOOL

DESCRIPTION

1. Technical Field

This invention relates to the apparatus and method for measuring the gap between a component and its associated board, and pertains more particularly to an optical means for determining the gap measurement.

One object of the present invention is to provide an optical gap measurement means which can measure the gap between a component and its associated board where the components are densely packed on the board.

Another object of the present invention is to provide a gap measurement tool which can measure the height of a component from a board wherein the height measurement is made at an acute angle with respect to the vertical from the board.

Another object of the present invention is to provide a gap measurement tool which can measure the height of a component from its associated board without damaging the components, wiring or other obstructions in a densely populated board.

Another object of the present invention is to provide an optical gap measurement method in which the width of the gap between the board and the component is calculated from other measured quantities.

2. Background Art

In the prior art, optical gap measurement means consist essentially of alternately imaging a resolution pattern on one and then the other of two surfaces between which the gap is to be measured. The resolution pattern is optimally focused on an opaque area adjacent to a transparent area of the upper surface of the gap, and subsequently on the lower surface of the gap through the transparent area by actuating a micrometer screw. The gap width can be read from the scale of the micrometer. The pattern can be shifted between the opaque and clear areas by movement of the entire optical system. U.S. Pat. No. 4,070,116, issued Jan. 24, 1978 discloses an automatic gap measuring device for defining the distance between two faces. The top face has alternate opaque and clear portions. The arrangement consists of an alternating image, an oscillating lens and two focus detectors. The oscillating movement of the lens effects a simultaneous movement of its image plane from the opaque to the clear area of the upper surface. Thus, the image plane is alternated between the surfaces limiting the gap. The focus detectors are spaced so as to alternately receive reflections from the alternate spaces. The output of a sensing device indicating the position of the oscillating lens and hence of its image plane is combined with the outputs of the focus detectors resulting in an indication of the gap width. These prior art arrangements have the disadvantage that both of the surfaces forming the gap must not be obstructed so that the image cannot be formed thereon. In the case of the present invention, the above described optical gap measuring devices are not usable since the area between the components which constitutes the clear areas allowing access to the lower surface of the gap is obstructed by wiring lines and connecting pads on the board. Also the component itself is not clear so that the light cannot project the image to the top surface of the gap.

BRIEF DESCRIPTION OF THE DRAWINGS

In the accompanying drawings forming a material part of this disclosure:

FIG. 1 is a schematic isometric view of the height measurement tool.

FIG. 2 is a schematic representation of the view obtained looking into the viewing means along line 2—2 of FIG. 1.

FIG. 3 is a blown-up side view of the gap between the component and the substrate showing the various triangles formed by the light beam and viewing means defined therein.

FIG. 4 is a schematic side view showing the gap between the chip and the substrate with the angle of viewing at a 45° angle with respect to the vertical from the substrate.

FIG. 5 is a blown-up schematic representation of the view obtained looking along the 45° angle of vision.

DISCLOSURE OF THE INVENTION

Figure 6:
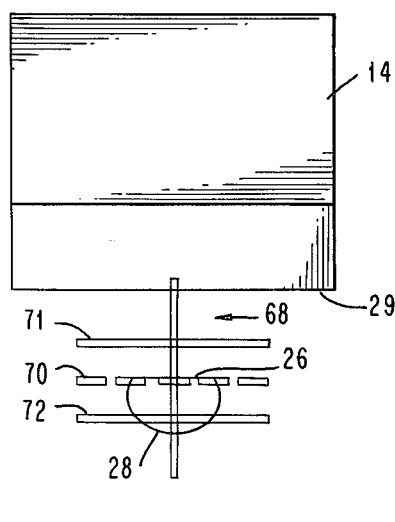
FIG. 6 is a schematic view looking at the chip and substrate along the angle of vision with the middle element of a three element reticle tangent to the edge shadow line in the light spot.

For further comprehension of the invention, and of the objects and advantages thereof, reference will be had to the following description and accompanying drawings, and to the appended claim in which the various novel features of the invention are more particularly set forth.

The optical gap measurement tool measures small gaps 10 between surfaces such as the bottom surface 12 of a chip 14 and the top surface 16 of a substrate 18 to which the chip is attached. The chips are attached to the substrate using solder balls (not shown) as the connecting means. It is essential that the gap 10 or height of the chip 14 from the substrate 18 be maintained at a predetermined distance. The chips 14 are arranged in a square array and are densely packed. For example, the chips 14 are spaced from one another at approximately a distance of 8.5 mm. This 8.5 mm wide portion of the board between chips carries circuit lines and connector pads. These circuit lines and pads preclude the use of any mechanical means for measuring the gap distance such as a shim which has a width equal to the desired or designed gap width. Not only would a mechanical measuring tool be obstructed by the wiring and pads, but also might cause damage to the fragile chip surface circuits. The substrate 18, carrying the chips 14 determining the gaps to be measured, is mounted on a viewing table 20 which is adjustable horizontally in both the X and Y directions. A light source 22 for generating a collimated light beam 24 is arranged vertically above the viewing table 20. The chip 14, whose gap 10 is to be measured, is moved horizontally by moving the table 20 such that the edge of the chip 14 intercepts the collimated light beam 24 and produces a flat edge 26 on the light spot 28 reflected from the substrate 18. This edge shadow 26 in the light spot 28 will be directly below the edge 29 of the chip 14 and an imaginary line 30 drawn from the edge shadow 26 to the bottom edge 29 of the chip 14 would be perfectly vertical with respect to the substrate and its length would define the gap 10 width. The collimated light source 22 generates a light beam 24 approximately 0.1 mm in diameter. The circuit lines and connector lands (not shown) which are placed on the board or substrate 18 between the chips 14 are placed thereon with such precision that there is no interference problem with the light spot 28 reflected from the board directly under the edge 29 of the chip 14. Since the substrate 18 carrying the array of chips 14 is attached to the movable X-Y table 20 any chip 14 in the array can be adjusted by the table movement to have an edge which intercepts the collimated light beam 24. A viewing means 32, such as a microscope or a TV camera, is positioned at a predetermined sight angle 34 with respect to the vertical plane extending from the substrate 18 and including therein the edge 29 of the chip 14 which intercepts the collimated light beam. The vertical from the board is represented by imaginary line 30. The predetermined angle 34 at which the microscope line of sight is locked depends upon the density of mounting of the chips 14 on the substrate 18 and the obstructions therebetween. A 45° angle 34 simplifies the subsequent calculations, however, smaller angles 34 with respect to the vertical plane are usable. Of course, as the sight angle 34 of the microscope is made sufficiently small to approach the vertical, the subsequent gap 10 measurement becomes less reliable because of the problem of accurately measuring the small distances resulting therefrom. The microscope 32 used in the gap measurement tool is a single barrel type microscope which includes reticle 35 having a cross-hair 36 which is movable horizontally within the microscope viewing area by a knob 38 which contains a micrometer 40 indicating the horizontal distance moved by the reticle 35. The viewing area 42 of the microscope 32 should be large enough to include both the light spot 28 reflected from the substrate 18 produced by the collimated light source 22 and the bottom edge 29 of the chip 14 whose height from the substrate is to be measured.

In operation, the reticle 35 horizontal component or member 36 is aligned tangent to the flat edge 26 on the light spot 28 and the measuring micrometer 40, associated with the reticle movement knob 38, reading is noted. The reticle 35 is then moved horizontally until the horizontal member 36 of the reticle is tangent to the bottom edge 29 of the chip 14 whose height or gap from the board 18 is to be measured. The resultant reading on the micrometer 40 is noted and the difference between the two readings represents the horizontal distance the reticle 35 has moved. Of course, instead of moving the reticle 35 within the microscope 32, the entire microscope 32 could be moved horizontally and the distance moved measured to give the same result. The distance the reticle 35 is moved horizontally in going from the chip edge shadow line 26 on the spot of light 28 to the bottom edge 29 of the chip 14 forms one side of a right triangle. This is defined as line 44 in FIGS. 1 and 3. The other side of the triangle is represented by the vertical line 30 between the edge shadow 26 on the light spot 26 and the bottom edge 29 of the chip 14 whose gap height 10 is being measured. Of course, these lines are imaginary and are merely represented by distance measurements. It should be noted that the imaginary vertical line 30 between the edge shadow line 26 and the bottom edge 29 of the chip represents the gap distance or width 10 to be measured. The third side or the hypotenuse 46 of the triangle is formed along the line of sight or at the same angle 34 with respect to the vertical that the microscope 32 is fixed at. This imaginary line 46 can be considered as connecting the top of the gap distance line 30 and the end of the measured distance of the horizontal movement of the reticle line 44. Thus, we have a right triangle with one known angle 34 and one known length of side 44. The angle 34 being the angle the line of sight makes with the vertical line as indicated in FIGS. 1 and 3. Using the geometrical co-tangent formula, the co-tangent of angle 34 times the side 44 (opposite side) equals the adjacent side 30. The adjacent side 30, as previously mentioned, is the gap 10 width being measured. Accordingly, the gap 10 width has been measured optically without damaging the chip or having to rearrange the wiring and pads on the board.

The method of measuring the gap 10 between the substrate 18 and the bottom of the chip 14 consists of aligning the horizontal line 36 of the reticle 35 tangent to the bottom edge 29 of the chip 14 whose height from the board is to be measured. The micrometer 40 reading is noted and the reticle 35 is moved horizontally from the bottom edge 29 of the chip 14 to a position tangent to the chip shadow edge 26 on the light spot 28. At this point or position the reading of the micrometer 40 is again noted. The difference between the two micrometer readings is the horizontal distance moved by the reticle. This distance is represented by an imaginary line 50 of FIGS. 1 and 3 which forms one side of a right triangle. The other side of the right triangle is an imaginary line indicated as line 30 extending between the edge shadow line 26 in the light spot 28 on the substrate 18 and the bottom edge 29 of the chip 14. This distance is the gap 10 width to be measured. The line of sight of the microscope 32 which is fixed at the predetermined angle 34a of the microscope forms the hypotenuse or line 52 which extends from the edge shadow line 26 on the light spot 28 to the end of the horizontal line 50 representing the horizontal movement of the reticle is going from the edge 29 to the edge shadow line 26 on the light spot 28. It should be noted that the horizontal movement of the reticle 35 is in the opposite direction of the horizontal movement of the reticle in the first example described above. Knowing the size of angle 34a, the angle that the fixed microscope 32 makes with the vertical plane between the substrate 18 and the chip edge 29, and knowing the measured distance of the opposite side 50 of the right triangle, the length of the adjacent side 30 can be determined using the co-tangent function which is equal to the adjacent side over the opposite side.

The simplest form of the invention is shown in FIG. 4 where the line of sight 56 of the microscope is fixed at an angle of 45° with respect to the vertical plane extending from the chip edge shadow on the light spot to the bottom edge of the chip 29 causing the shadow. Line 60 can be drawn which represents the hypotenuse of a 45° right triangle. Aligning the horizontal member of the reticle tangent to the edge shadow 26 and moving the reticle 35 to the bottom edge 29 of the chip 14, and measuring the horizontal distance moved by the reticle, the distance represented by line 62 is measured. In the case of a 45° right triangle, both sides are equal, therefore, the horizontal measurement defining the line 62 is equal to the gap 10 width measurement defined by the other side of the triangle, line 64. Again, measuring the horizontal distance moved by the reticle 35 in moving from a position tangent to the bottom edge 29 of the chip 14 to a position tangent to the edge shadow line 26 on the light spot 28, defines line 66 in FIG. 4. Since it is a 45° right triangle, the adjacent side 64, which is the gap width 10 to be measured, is equal thereto and, therefore, is measured. FIG. 5 represents the view obtained looking into the microscope 32 when the microscope is fixed at a 45° angle with respect to the vertical plane from the substrate 18 which includes the bottom edge 29 of the chip 14 whose height from the board is to be measured. This view shows the horizontal cross-hair line 36 of the reticle 35 aligned tangent to the bottom edge 29 of the chip 14.

Figure 7:
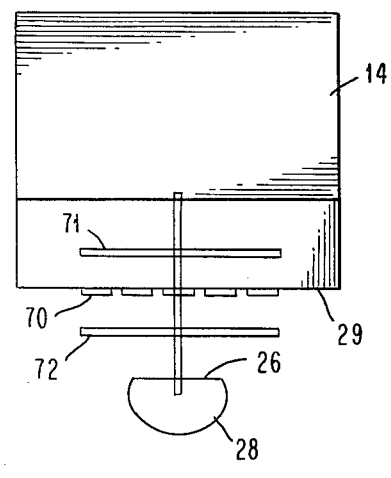
FIG. 7 is a schematic representation of a view looking along the line of vision with the middle line of the reticle tangent with the bottom edge of the chip.

FIG. 6 is a schematic view looking into the microscope 32, wherein the microscope includes a three cross-member reticle 68. The middle member 70 of the reticle 68 is shown aligned tangent to the chip edge shadow line 26 on the light spot 28. It should be noted that these reticle lines 70, 71, 72 have a certain thickness and, therefore, one side or the other of the member should be aligned with the edge shadow line 26. In FIG. 6, the top side of the middle line 70 is shown aligned tangent to the chip edge shadow line 26 on the light spot 28. FIG. 7 shows the same view in the microscope 32 with the reticle 68 aligned with the bottom edge 29 of the chip 14. It should be noted, that the same side of the reticle 68 should be aligned tangent to both the chip edge shadow line 26 and the bottom edge of the chip 29. For example, FIG. 7 shows the top side of the middle line 70 of the reticle 68 being aligned tangent to the bottom edge 29 of the chip 14. This corresponds to the tangent alignment of the top side of the mid-line 70 of the reticle 68 with the chip edge shadow line 26, as shown in FIG. 6. It should be obvious, that if the same side of the reticle 68 cross-member is not used consistently in making the measurements, an error will be introduced which will be the equivalent of the thickness of the reticle line.

Figure 8:
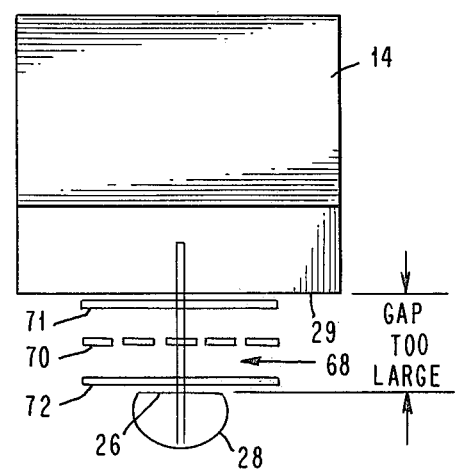
FIG. 8 is a schematic representation of the view obtained looking along the line of vision showing the three element reticle indicating that the gap is greater than the design requirement.
Figure 9:
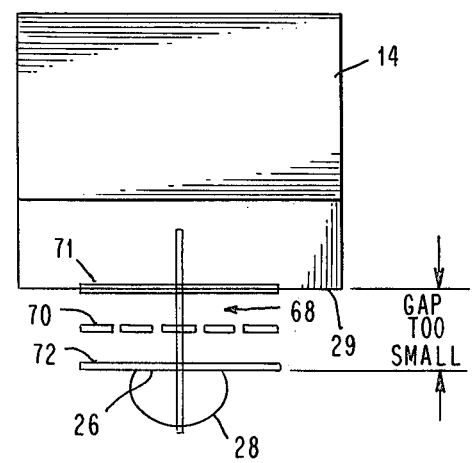
FIG. 9 is a schematic view looking along the line of sight showing a three element reticle wherein the gap is less than the design requirement.

FIG. 8 is a view looking into the microscope 32, wherein a three element reticle 68 is included therein, and the distance between the outside reticle elements or lines 71, 72 is equal to the distance that should exist between the edge shadow flat 26 on the light spot 28 and the bottom edge 29 of the chip 14 for the predetermined fixed angle 34 of the microscope 32. If the gap 10 to be measured is wider than its designed width, the outside cross-hair members 71, 72 of the reticle 68 will not reach the surfaces defining the gap when the reticle is centered in the gap. Of course, if one of the outside reticle cross-members is aligned with its corresponding light spot or chip edge surface, the other outside cross-member will not reach its associated surface. Similarly, FIG. 9 shows the situation where the distance between the flat edge 26 on the light spot 28 and the bottom edge 29 of the chip 14 is less than the designed width represented by the distance between the outside members 71, 72 of the reticle 68. Thus, if one of the reticle outside cross-members 71, 72 is aligned tangent to its adjacent outside surface, such as the edge shadow flat 26 on the light spot 28, the other outside cross-element of the reticle 68 will be above or beyond its associated surface edge indicating that the gap is less than the designed width. Thus, we have a go-no-go tester which, with a minimum of adjustment, will immediately indicate whether the gap 10 is bigger than, less than or equal to the design specification.

It should be noted that the micrometer adjustment knob 38 on the microscope 32 shown in FIG. 1, can be tied into a display unit, such as a digital display unit, which immediately displays the horizontal distance the reticle is moved. In the case of the 45° fixed angle of the microscope as shown in FIG. 4, this output display would be the actual measurement of the gap 10. In the case of an angle other than 45°, some calculation or built-in resolutions are necessary to display the actual gap measurement for the horizontal distance moved by the reticle, as indicated on the micrometer.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by Letters Patents is:

1. A gap measurement tool for measuring a small gap between surfaces such as the bottom surface of a component and the top surface of a substrate comprising:
   light source means for generating a collimated light beam vertical to the substrate;
   means for horizontally moving the component whose height from the substrate is to be measured so that an edge thereof intercepts said light beam and produces an edge shadow on the light spot reflected from the substrate;
   a viewing means locked at a predetermined angle with the vertical plane from the substrate which includes the edge of said component intercepting said light beam;
   a movable reticle located within said viewing means;
   means for adjusting said reticle tangent to said flat edge on the light spot or to the bottom edge of said component;
   means for horizontally moving the reticle from either one of said edge shadow on the light spot or the bottom edge of said component to the other;
   means for measuring the horizontal distance moved by said reticle;
   said horizontal distance measured being the length of the opposite side of a right triangle with the gap between the bottom surface of said component and the top surface of said substrate being the adjacent side and the hypotenuse being the line of sight from the bottom edge of said component to the end of said measured horizontal distance at the fixed angle of said viewing means with the vertical from the substrate;
   means for calculating the length of the adjacent side of the right triangle from the fixed angle with the vertical from the substrate and the measured length of the opposite side of the right triangle.

2. A gap measurement tool according to claim 1, wherein said viewing means is locked at a 45° angle with respect to the vertical from the board and said horizontal distance measured is equal to the gap between the bottom surface of said component and the top surface of said substrate.

3. A gap measurement tool according to claim 1, wherein said movable reticle consists of three parallel members equally spaced from one another such that the distance between the outer members is equal to the designed distance between the edge shadow on the light spot and the bottom edge of said component when viewed through the microscope at a predetermined fixed angle of the line of sight, and wherein the reticle is moved so that one or the other of the outside reticle members is tangent to its respective edge of the component or the edge shadow on said light spot to provide an indication of whether the gap being measured is greater than, less than or equal to the designed gap width depending upon whether the opposite outside reticle element falls short of, tangent to or beyond its respective edge of the component or the edge shadow of the spot.

4. A gap measurement tool according to claim 1, wherein said reticle is adjusted tangent to said edge shadow on the light spot at which position said measuring means is read and said reticle is moved horizontally forward until it is tangent to said bottom edge of said component at which position said measuring means is read, the difference between the readings being said horizontal distance moved by said reticle.

5. A gap measurement tool according to claim 1, wherein said reticle is adjusted tangent to said bottom edge of said component at which position said measuring means is read and said reticle is moved horizontally backward until it is tangent to said edge shadow on the light spot at which position said measuring means is read, the difference between the readings being said horizontal difference moved by said reticle.

6. A gap measurement tool according to claim 1, wherein said means for calculating the gap width between the bottom surface of the component and the top surface of the substrate is equal to the co-tangent of the predetermined angle of said viewing means with respect to the vertical from the substrate multiplied by the horizontal distance moved by said recticle.

7. A gap measurement tool according to claim 1, wherein said viewing means is a television camera and associated display.

8. A gap measurement tool according to claim 1, wherein said means for measuring the horizontal distance moved by said reticle includes a micrometer scale.

9. A method of measuring the gap between the bottom surface of a component and the top surface of a board or the like comprising the steps of:
generating a beam of collimated light vertical to the board so as produce a light spot on the board;
moving the components so as to intercept the beam of light or right angles thereby producing a component edge shadow in the light spot;
fixing a viewing device at a predetermined angle with respect to the vertical from said board and at a position to include the edge shadow in the light spot and the bottom edge of said component in the view;
fixing the reticle of the sighting device tangent to one of the edge shadow in the light spot or the bottom edge of the component;
moving the reticle of the sighting device horizontally from one of the edge shadow in the light spot or the bottom edge of the component to the other;
measuring the distance the reticle moves in going from one of the edge shadow in the light spot or the bottom edge of the component to the other;
this distance representing the opposite side of a right triangle with the gap between the component and the board being the adjacent side and the hypotenuse extending from the end of the opposite side to the end of the adjacent side along the fixed angle of the viewing device;
calculating the length of the adjacent side of the right triangle extending vertically from the top surface of the substrate to the bottom surface of the component from the fixed angle of the viewing device with the vertical from the substrate and the measured length of the opposite side.

10. A method of measuring the height of a component from a board or the like according to claim 9, wherein the predetermined angle with respect to the vertical from said board at which the viewing device is fixed is 45° and the calculated length of the side of the triangle extending vertically from the top surface of the substrate to the bottom surface of the component is equal to the measured length of the opposite side.

* * * * *